March 5, 1935.  H. T. AVERY  1,993,701
AIRCRAFT
Filed Jan. 6, 1931   4 Sheets-Sheet 1

INVENTOR.
Harold T. Avery

March 5, 1935.  H. T. AVERY  1,993,701
AIRCRAFT
Filed Jan. 6, 1931  4 Sheets-Sheet 2
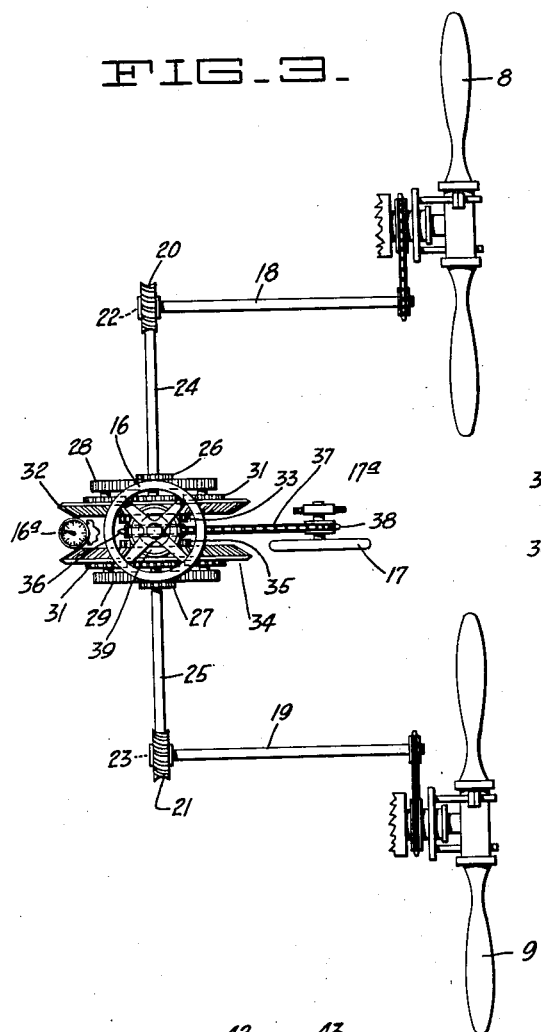
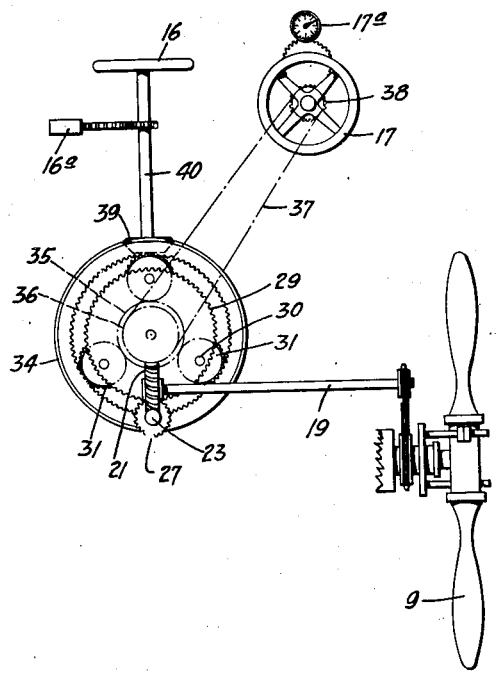
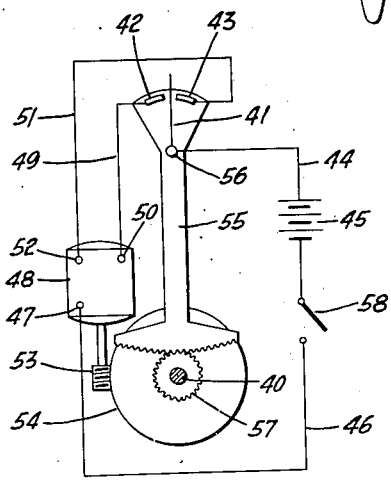
INVENTOR.
Harold T. Avery

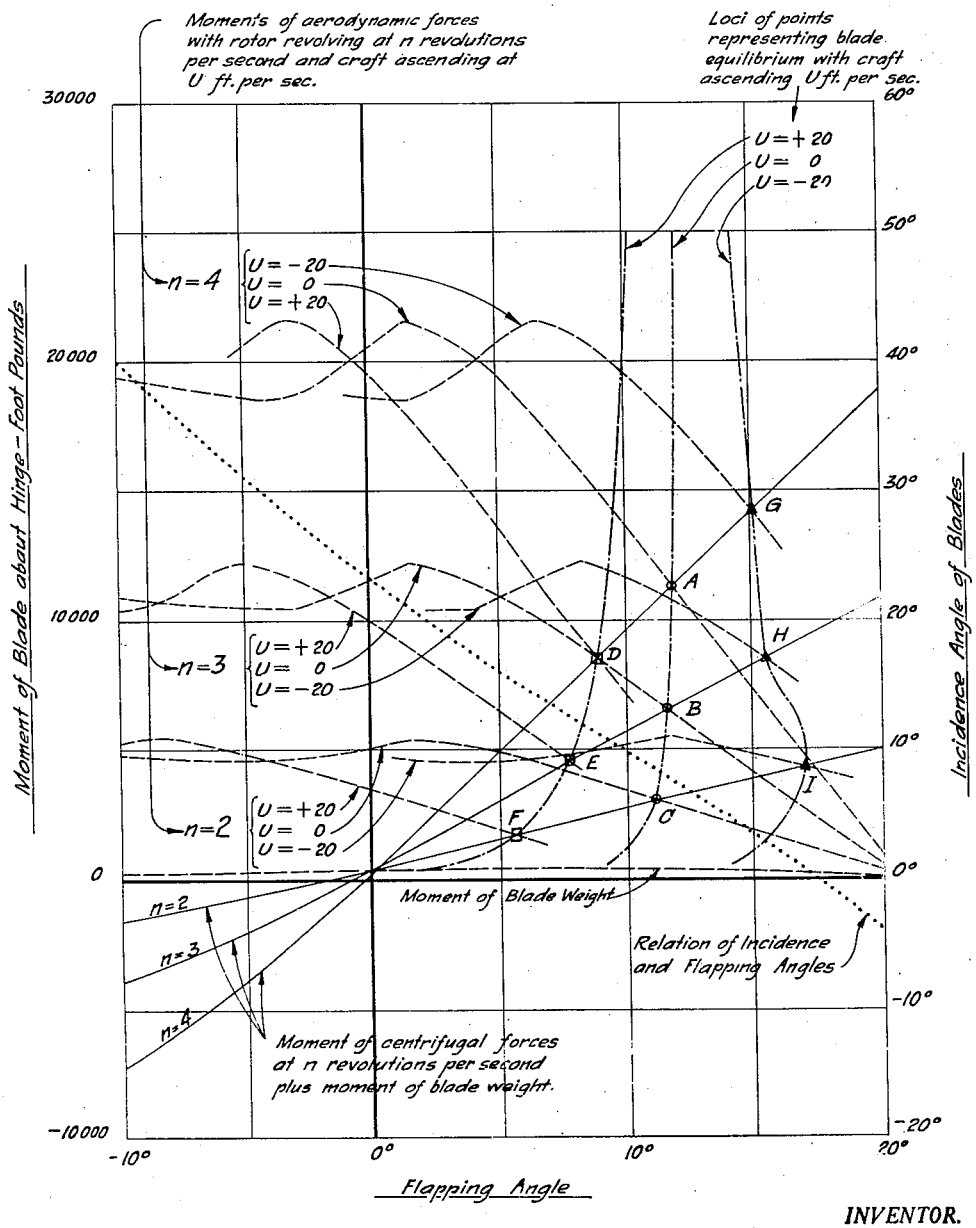
FIG-7-

March 5, 1935. H. T. AVERY 1,993,701
AIRCRAFT
Filed Jan. 6, 1931 4 Sheets-Sheet 4
FIG. 8.
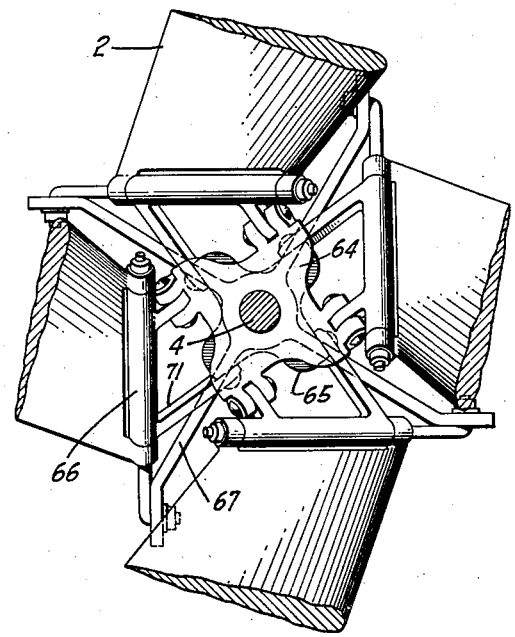
FIG. 9.
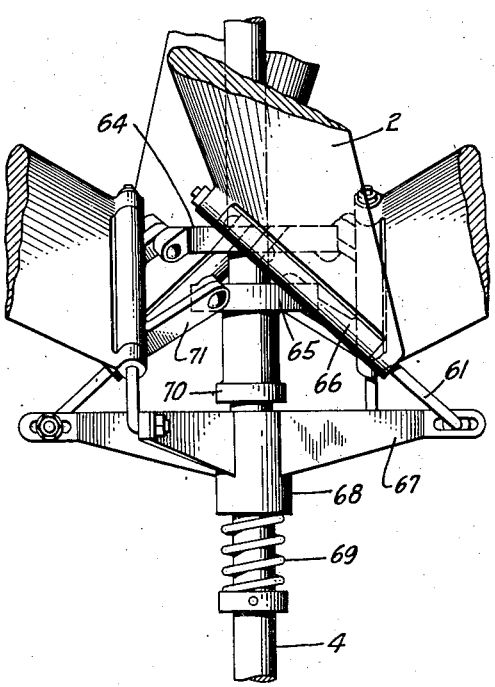
FIG. 10.
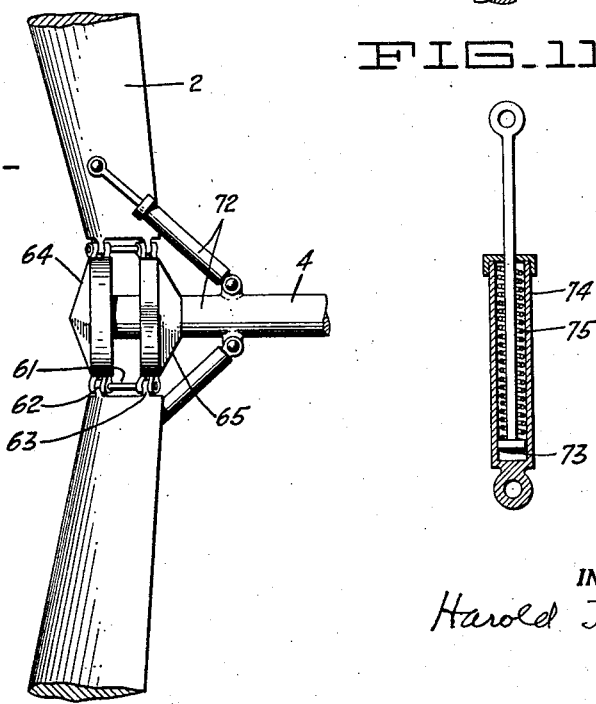
FIG. 11.
INVENTOR.
Harold T. Avery Patented Mar. 5, 1935

1,993,701

UNITED STATES PATENT OFFICE 1,993,701

AIRCRAFT

Harold T. Avery, Oakland, Calif., assignor to Autogiro Company of America, Willow Grove, Pa., a corporation of Delaware Application January 6, 1931, Serial No. 506,924

35 Claims. (Cl. 244—19)

This invention relates to a new type of heavier-than-air craft capable of moving through the air in any direction, and yet without the shortcomings of any of the craft previously proposed or attempted for such performance.

The objects of the invention are to provide a heavier-than-air craft with the following characteristics:

1. The ability to arise or descend vertically or at any desired angle,
2. The ability to proceed as slowly as may be desired in any direction,
3. Inherent stability insuring that the craft remains right side up at all times,
4. The ability to stay under proper control and to descend at safe speeds in case of engine failure,
5. Provision for applying the engine power in any desired proportions to the horizontal propelling and vertical lifting means,
6. The arrangement of twin engines and propellers in such a manner that no turning effect is set up by the failure of either engine,
7. Provision for automatically altering the characteristics of the craft according to its operating conditions so as to render it efficient as a helicopter at varying rates of ascent, as a craft for horizontal transportation under varying conditions of speed, loading, and angle of climb, and as a craft safe for powerless descent either vertically or at an angle.
8. Provision of a simple type of rotor adapted to automatically adjust the incident angles of the blades to meet a widely varying range of conditions, including rapid climb under power, safe descent without power, and horizontal flight at any speed within the maximum attainable by the craft,
9. Provision for utilizing the propelling means for balancing the driving torque of the lifting means,
10. Provision of especially convenient means for simultaneously adjusting horizontal torque, and longitudinally propelling and vertically lifting forces,
11. Provision of means for automatically adjusting the horizontal torque during driving of the lifting means so as to keep the craft headed in a fixed direction,
12. In connection with the automatic means for adjusting torque provision for steadying the craft into the chosen direction without undue oscillation or hunting, and
13. Utilization of a type of lifting means designed to require a minimum of rigidity and weight.

Further objects of the invention are to provide a unique aircraft of superior qualities, and to combine in a single craft in the largest possible measure all the advantages of various existing and proposed types of heavier-than-air craft.

Other objects and advantages will hereinafter appear.

In addition to the above novel results, several constructional features of the invention will be apparent from the following specifications and claims. The invention consists in the novel combination of parts as hereinafter set forth.

The general principles of the invention and the relation of parts in a preferred embodiment of the invention are described in the following specifications and illustrated in the accompanying drawings. The broad scope of the invention is particularly set forth in the appended claims.

In the drawings:

Fig. 2 is a right side elevation of the mechanism for controlling the pitch of the propellers.

Fig. 3 is a plan view of the same mechanism.

Fig. 4 is a diagram of the mechanism proposed for automatically controlling the difference of pitch of the two propellers.

Fig. 7 gives a series of curves illustrating typical equilibrium and performance conditions for such a rotor in vertical flight.

Figs. 8 and 9 are a plan and elevation, respectively, of an alternative type of rotor.

Figures 5, 6:
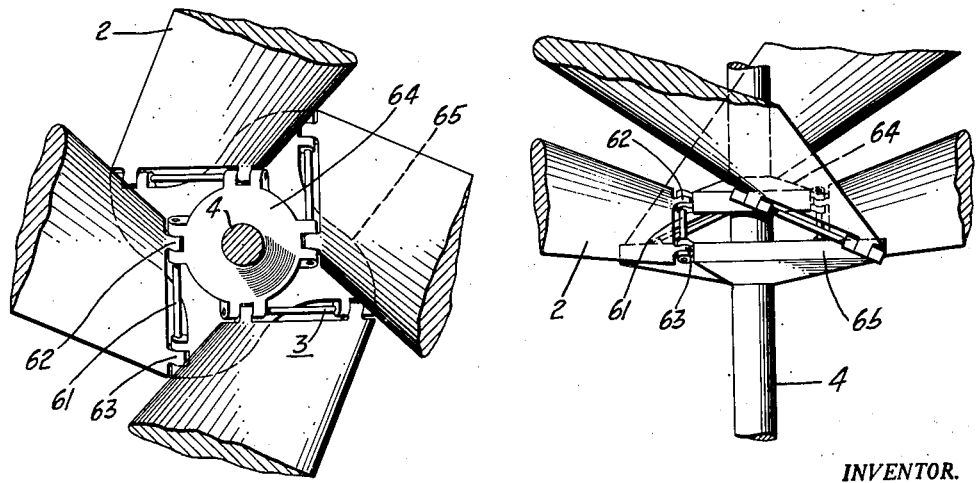
Figs. 5 and 6 are a plan and elevation, respectively, of the type of rotor I propose to employ, the blades being broken away leaving only the central portion of the rotor and showing particularly the arrangement of hinges.

Fig. 10 is a side view of a propeller employing substantially the same type of pitch control as that used in the rotor shown in Figs. 5 and 6.

Fig. 11 is a cross section of an extensible member employed in the propeller shown in Fig. 10.

Figure 1:
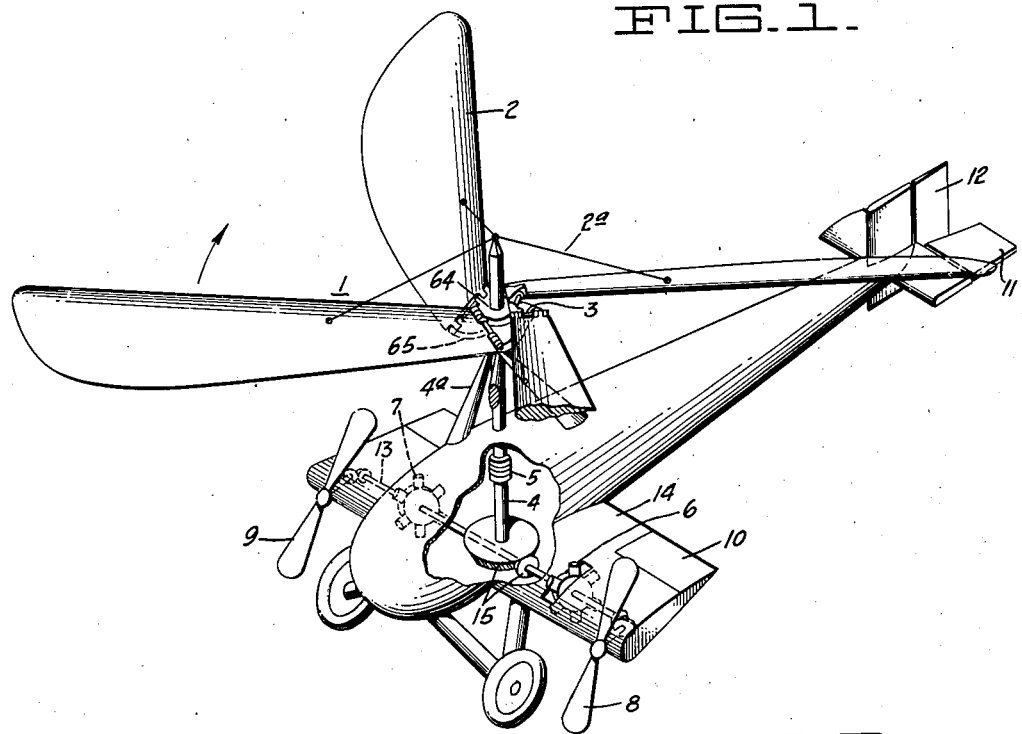
Fig. 1 is a perspective view of the craft, showing the general arrangement proposed, but not the control mechanism.

Such subject-matter hereof as is based in detail on Figures 2, 3 and 4 and in general on Figure 1 has been taken from my copending application Serial No. 418,860, filed January 6, 1930.

General arrangement

The general arrangement of the preferred embodiment of my proposed craft is indicated in Fig. 1, in which 1 indicates the rotor for exerting vertical lift. This rotor consists of four blades 2, pivoted to shaft 4 by hinges 3. Blades 2 are shaped as airfoils, and each blade is attached to the rotor shaft (as described more in detail hereinafter) by means of a hinge about which it is free to rotate and assume such flapping angle as may be required to place in equilibrium the forces acting on it, these forces being principally centrifugal force and aerodynamic lift and drag.

Shaft 4 is arranged to be broken beneath the point of attachment of the blades by a clutch 5, which, when released, leaves the rotor as a freely rotatable member, but when engaged leaves it connected through the mechanism hereinafter described to engines 6 and 7. This clutch may preferably be a free wheeling clutch of any well known variety, or may alternatively be any well known type of manually operated clutch.

Engines 6 and 7 are engines of any suitable type, connected by any suitable means, for instance, such as that illustrated in Fig. 1, to propellers 8 and 9, which are rotatable on substantially longitudinal axes located to the left and right, respectively, of the longitudinal axis of the craft. The engines may be mounted directly on the propeller shafts, as is the customary airplane practice, or preferably they may be mounted on a common cross shaft 13 (as shown in Fig. 1) to which the propeller shafts are geared. With this arrangement it is possible to obtain the advantages of geared propellers, the propellers rotating at less than engine speed, without adding any gearing other than that which would otherwise necessarily be employed in the craft. Obviously a single engine could be employed in place of engines 6 and 7, but I prefer the two separate engines, since the probability of complete engine failure is thus greatly reduced and with my arrangement the craft can operate with one engine functioning just as well as with the same power being derived from two engines, since both propellers will always turn at the same speed.

Propellers 8 and 9 both have arrangements for varying the pitch of the propeller blades with suitable means for controlling the pitch, and one, at least, (in this embodiment propeller 9) has arrangements for reversing the pitch so as to reverse the effective direction of propeller thrust.

Engines 6 and 7 are arranged so that in addition to driving propellers 8 and 9, they will through bevel gears 15 drive rotor shaft 4. Thus the two engines will always turn at the same speed, the two propellers synchronously at a speed proportional to engine speed, and the rotor shaft at another speed also proportional to engine speed, thus driving the rotor at this latter speed whenever clutch 5 is engaged.

The control surfaces of the craft, including ailerons 10, elevators 11, and rudder 12, may be substantially similar to present airplane design and may be under their customary controlling means (not shown). A small wing 14 may optionally be provided enclosing shaft 13 and the aileron supports.

PROPELLERS

Need for pitch adjustment of propellers

If the two propellers were to be adjusted to zero pitch, that is with their blades turned flat in the plane of rotation, the propellers would exert no thrust and would offer no resistance to turning except frictional resistance, with the result that the speed of the engines would be determined primarily by the rotor resistance, practically all the power of the engines automatically going to the rotor. When in the air, however, the craft would tend to rotate in the direction opposite to that in which the rotor was being driven, since the torque exerted by the craft on the rotor would cause an equal and opposite torque to be exerted by the rotor on the craft. With the rotor being driven in a clockwise direction as indicated in Fig. 1, it would be necessary to set propeller 9 at a negative pitch so as to exert a backward thrust and propeller 8 at a positive pitch so as to exert a forward thrust in order to keep the craft from rotating. To hold the craft stationary with respect to the air, the forward and backward thrusts should be equal, but to produce longitudinal motion with respect to the air, they could be unbalanced, or even both made positive so long as a difference of pitch between the two propellers be maintained such that the difference of propeller thrusts will set up a torque equal to the rotor driving torque.

In taking off, the propellers may be set for equal positive and negative pitch, that is the blades of propeller 8 set at a positive pitch equal in amount to the negative pitch of the blades of propeller 9. A comparatively slight pitch should, under proper design, be sufficient to set up thrusts of the proper amount to balance the driving torque. Should the craft commence to turn in the same direction as that in which the rotor is turning, the pitches may be decreased, while if it should start to turn in the opposite direction, they may be increased, thus always readjusting the propeller thrusts to whatever values prove necessary to hold the craft on its desired heading. Whatever power is not required by the propellers, at their light pitch setting, will automatically be passed on to the rotor, the two propellers and the rotor being turned at speeds depending on the total of their resistances and on the amount of throttle set on the engines.

If with the craft in the air under balanced conditions as set forth above, the engine throttles be opened wider, thus increasing the power output of the engines, the propellers and rotor will both speed up accordingly. Thus the increase in driving torque is accompanied by an increase in the propeller thrusts, thus tending to preserve the balance of conditions, but since there is no guarantee that both the rotor resistance and propeller thrusts will increase in exactly the same proportion, slight readjustments of pitch may prove necessary during the period of acceleration following the change of throttle setting. However, it is evident that with comparatively minor readjustments the craft may be kept from being displaced by the rotor driving torque in spite of changes in the power output of the engines.

When it is desired to exert a longitudinal propelling force, the pitch of propeller 8, which is exerting a forward thrust, may be increased so as to increase that thrust, and the pitch of propeller 9, which is exerting a backward thrust, decreased so as to decrease that thrust. In this manner the difference of the two thrusts may be maintained equal to its original value, so that the same counterbalancing torque will be set up, but the sum of the two thrusts changed from zero, as in the case where the two thrusts are equal and opposite, to a positive value exerting a propelling force tending to drive the craft forward. The pitch of propeller 9 may even be changed from a negative to a positive value of any desired amount, so long as the pitch of propeller 8 is maintained continuously enough greater to set up the proper turning effect to counterbalance the driving torque of the rotor. As the pitches of the propellers are thus increased, they will require an increasing amount of power to keep them up to speed. However, as the craft gains speed the rotor will become continually more nearly self-rotating due to the action of the airstream upon it in the manner hereinafter described in more detail. Therefore, as the craft gains speed, the rotor will require continually less power. It is possible to so design the craft a point may be reached at which, in horizontal flight, the rotor is completely self-rotating, whereupon clutch 5 may be opened if desired, or, if a free wheeling clutch is employed, will automatically disengage. Such free wheeling clutch may be substantially of the character shown in U. S. Patent No. 1,673,232, or any other suitable type. During this decrease in power delivery to the rotor, the difference in pitch of the two propellers would have to be gradually decreased until as the air commenced to drive the rotor up to the same speed that the engines tend to drive it the difference of pitch necessary to keep the craft from turning would reach zero. The necessary pitch difference reaching zero could very conveniently be utilized as the signal for the proper time to open clutch 5, in case that clutch is not of the free wheeling variety.

In many embodiments of the craft it may, however, actually prove more efficient to so design the craft that instead of actually becoming self-rotative the rotor will continue to require the application of a small driving torque, for though a certain amount of power would thus be consumed that would otherwise be available for the horizontal propellers, the angles of attack of the blades may, under certain circumstances, be maintained within ranges giving sufficiently more favorable ratios of lift to drag than those obtainable with the angles required for self-rotation so as to effect an even greater saving in power requirements for the horizontal propellers. In any case the power requirement of the rotor is comparatively low when the craft has considerable horizontal speed and preliminary calculations indicate that it will have a very high efficiency in horizontal flight as compared with other aircraft.

When it is desired to decrease forward velocity, either to ascend, descend, or hover, simultaneous decrease of the pitches of propellers 8 and 9 will result in a loss of forward velocity, which usually will be accompanied by an increase in rotor power requirements. This increase will be in general (unless accompanied by increased climb), considerably less than the decrease in the propeller power requirements, and on account of the momentum of the craft will lag considerably behind the decrease. Therefore as the craft is slowed down it may be controlled into the desired rate of climb or descent by throttling the engines, slowing down without throttling being necessarily accompanied by increase of climb. Should the rotor have been self-rotating prior to slowing down, and the slowing not be accompanied by an increase in rate of descent sufficient to maintain it self-rotating, clutch 5 would, if of the free wheeling type, automatically engage when power requirements demanded, or if of the manual type would have to be engaged manually as soon as rotor speed fell to its standard ratio to engine speed. The increase in rotor driving torque would necessarily have to be accompanied by an increase in pitch difference between propellers 8 and 9 to avoid turning the craft from its course.

In taking off or landing with the wind blowing, the craft should be headed into the wind and the propeller blades set at pitches producing enough net longitudinal thrust to produce an air speed of the craft equal to the wind speed, in order to hold the craft stationary with respect to the ground instead of with respect to the air.

Pitch controlling means

From the above general outline of the operation of the craft it is evident that convenient means should be provided for controlling the difference of pitch of the two propellers, and separate means for altering the sum of the pitches of the propellers. I propose to accomplish this by the mechanism illustrated in Figs. 2 and 3, while in Fig. 4 I show an alternative means for automatically controlling the difference of pitch.

Referring to Figs. 2 and 3, wheel 16 controls the difference of pitch of the two propellers, while wheel 17 controls the sum of the pitches. Wheel 16 therefore controls the net tendency of the craft to turn or change its direction of heading, and being a horizontal wheel is very convenient for the purpose, a turn to the right increasing the tendency of the craft to turn to the right by algebraically increasing the pitch of the left propeller and decreasing that of the right propeller. A turn to the left, of course, produces exactly the opposite effect. Wheel 17 controls the net tendency of the craft to move forward or backward, and being mounted in a vertical longitudinal plane is convenient for the purpose. A forward turn of the wheel algebraically increases the pitch of both propellers without changing their difference of pitch, while a backward turn correspondingly decreases their pitch. In order to make the resultant position of either of these wheels readily apparent in spite of the fact that they may have to be turned several turns to effect an adjustment, there may be provided indicators 16a and 17a in conjunction with wheels 16 and 17, respectively, each geared to its respective wheel at a ratio keeping the total range of movement of the indicator at less than one turn.

Extending forwardly into the vicinity of propeller 8 is a shaft 18 adapted to increase the pitch angle of the blades of propeller 8 when shaft 18 is rotated in one direction, and to reduce the pitch angle when rotated in the opposite direction. This action of shaft 18 on the blades of propeller 8 may be accomplished by any well-known means for the purpose, not herein detailed. Extending forwardly into the vicinity of propeller 9 is another similar shaft 19. The blades of either propeller may be brought into any desired pitch angle by the proper amount of rotation of the corresponding shaft. Shafts 18 and 19 terminate rearwardly in worm gears 20 and 21, respectively, adapted to be driven by worms 22 and 23, respectively, rigid with shafts 24 and 25, respectively. Rigid with the inner ends of shafts 24 and 25, respectively, are pinions 26 and 27, meshing with gears 28 and 29, respectively, to each of which gears are rigidly attached three pins 30 on which planetary pinions 31 are free to rotate. The pinions 31 assembled on gear 28 mesh outwardly with ring gear 32 and inwardly with sun gear 33, while those assembled on gear 29 mesh outwardly with a similar ring gear 34 and inwardly with sun gear 35. Sun gears 33 and 35 are both rigid with sprocket 36, which is connected by chain 37 to sprocket 38 rigid with control wheel 17. Thus any rotation of wheel 17 produces a corresponding rotation of sprocket 36 and sun gears 33 and 35, which, with ring gears 32 and 34 stationary, will cause a feeding of planetary pinions 31 and rotation of gears 28 and 29 in the same direction, which transmitted through the connecting shafts and gearing, produces similar changes of pitch on the two propellers. The outer periphery of ring gears 32 and 34 is shaped to make them, in effect, twin bevel gears meshing with the common bevelled pinion 39, rigidly connected by shaft 40 to wheel 16. Thus any rotation of wheel 16 will produce equal and opposite rotary displacements of ring gears 32 and 34, which with sun gears 33 and 35 stationary will, through the action of pinions 31, produce equal and opposite rotations of gears 28 and 29, and of shafts 18 and 19, thus effecting equal and opposite changes of pitch on the two propellers, thereby altering the difference of pitch without changing the sum of the pitches of the two propellers. It is to be understood that the particular mechanism illustrated and described for controlling pitch is merely typical of the double differential arrangement required for the purpose.

*Automatic pitch control*

While an operator may quite easily control the craft by means of wheels 16 and 17 and the engine throttles, so as to produce any desired combination of lifting, propelling, and turning effects, the work of the operator would be made still easier by the use of the alternative means illustrated in Fig. 4 for automatically controlling the difference of propeller pitch. This means could be used to automatically position wheel 16, or that wheel be eliminated entirely in favor of the automatic means. In Fig. 4 member 41 represents an element adapted to be selectively displaced to the left or right by departures of the heading of the craft from a selected course. This may, for instance, be the indicating hand of an earth inductor or magneto compass, in which case it moves to left or right of its central position as the craft's heading moves to left or right of the course set on the compass controller (not illustrated), or it may be a member displaced by a moving member of a magnetic or gyro compass, in which case the course setting would require the placing of member 41 in proper angular relation to the moving parts of the compass. In any case, member 41 is selectively displaced by any change in the direction of the craft's axis from a chosen heading. It may be assumed to move in the direction of contact 42 for departures to the left of the course, and in the direction of contact 43 for departures to the right of the course. Member 41 is connected by wire 44 to source of electrical power 45, the other terminal of which source of power is connected by wire 46 to binding post 47 of motor 48. Contact 42 is connected by wire 49 to binding post 50 of the same motor and contact 43 by wire 51 to post 52 of the motor. On the shaft of motor 48 is worm 53 meshing with worm gear 54 rigid with shaft 40, which in the manner previously described controls the difference in pitch of the propellers. Motor 48 is a reversible motor adapted to rotate shaft 40 to the right when the circuit is closed through binding posts 47 and 50, and to the left when closed through 47 and 52. Contacts 42 and 43 are mounted on follow-up member 55, pivotally mounted on shaft 56, coaxial with the pivot of member 41. Member 55 is rotated on its pivotal axis in proportion to the rotation of shaft 40, by means of pinion 57 rigid with shaft 40 and meshing with member 55. Thus if there is insufficient difference of pitch between the two propellers, the craft will, with the rotor being driven to the right, commence to turn to the left, in consequence of which member 41 will move to the left onto contact 42, thus closing the circuit through binding posts 47 and 50 of motor 48 causing shaft 40 to rotate to the right, thus increasing the pitch of the left propeller and decreasing that of the right propeller thereby increasing the torque of the propelling means tending to turn the craft toward the right. The rotation of shaft 40 to the right is accompanied by a proportional rotation of member 55 to the left, thus acting to move contact 42 away from member 41 and stop the changing of pitch when the amount of change made is proportional to the amount of departure from course as indicated by member 41. Thus whenever the direction of the craft's axis commences to change, the pitch of the propellers is changed so as to alter the propelling forces in relative directions adapted to so alter the balance between the turning torque of the propelling forces and the rotor driving force as to produce a net tendency for the craft to turn in the opposite direction from that which produced its displacement from course, but as it comes closer to course the tendency to turn is reduced, since the total net change of pitch is always maintained proportional to the displacement of member 41 from center, due to the follow-up action of member 55. The result, therefore, is that shaft 40 is automatically moved so as to alter the difference of propeller pitch in a manner adapted to keep the net turning torque of the two propellers exactly counterbalancing the reaction from the rotor driving torque, except to cause it to alter from an exact balance by the proper amount to return the craft's axis into the chosen heading when it departs therefrom, but so reducing the net returning torque as the craft approaches the chosen heading as to prevent over actuation and hunting. In order to permit of optionally rendering the automatic means inoperative, switch 58 may be provided in wire 46, which when opened renders motor 48 inoperative.

ANALYSIS OF ROTOR REQUIREMENTS

*Fundamental aerodynamic considerations*

Rotors of the flapping blade type have previously been used or disclosed, both in the form of freely rotating rotors, as in the "autogiro", and in power driven helicopter rotors. In each type of use, however, it has most frequently been the practice to connect the blades to the shaft by means of hinges substantially perpendicular to the respective blade axes, with the result, and in fact the purpose, of maintaining the angle of incidence of the blade substantially constant at all flapping angles. With such an arrangement it has been impossible to efficiently combine vertical performance as a helicopter, with safe descent in case of engine failure, since for autorotation the angle of incidence of the blades should not, as a rule, exceed some $+4°$ to $+5°$, while with such an angle of incidence, vertical ascent as a helicopter is quite inefficient, since the greatest average effective angle of climb the blades can develop will be the difference between this incidence angle and the least angle of attack of the blade capable of developing the requisite lift, so that under the most favorable conditions the rotor would move upward on a very flat helix.

In this discussion the "flapping angle" of a blade is to be understood as referring to the angle the axis of a blade makes with a plane perpendicular to the rotor axis, angles of the blade above the plane being considered as positive. "Angle of incidence" is to be understood as referring to the angle between the chord of the airfoil of a blade cross-section and the path described by a point on such chord in rotating about the rotor axis, upward inclination of the leading edge being considered as positive. At a given blade setting the angle of incidence is fixed in the machine and it is not concerned with the direction of motion of the air with respect to blade. At low flapping angles it is substantially equal to the angle the airfoil chord makes with a plane perpendicular to the rotor axis. "Angle of attack" is to be understood as referring to the angle between the same airfoil chord and the airstream. As each blade engages the air and creates a lift it deflects downward the body of air passing it with the result that the next following blade engages downwardly moving air resulting in its effective angle of attack being reduced by a certain angle which will be referred to as the "angle of downwash". Obviously if a rotating rotor is not moving vertically, or laterally, but its general position is stationary with respect to the body of air, the angle of attack of each blade is equal to its angle of incidence minus the angle of downwash, while if the rotor is moving vertically the difference between the angle of incidence and the angle of attack effective on any blade element will be further altered by the angle of the airstream relative to the path of movement of the blade element about its axis, which will be referred to as the "angle of relative wind" and designated as positive when upward with respect to the blade as in the case of a descending craft. This angle will vary both with the rate of vertical movement and with the radius of the blade element from the rotor axis, a given vertical movement producing a numerically greater angle of relative wind for blade elements closer to the rotor axis because of their lesser rotational speed, and the consequent greater ratio of vertical to rotational speed for such elements.

To sum up the relation between these angles: Angle of attack=incidence angle+angle of relative wind—angle of downwash. This is, of course, an algebraic relationship, in which any of the terms may be either positive or negative. The angle of relative wind is positive when the craft is descending and negative when it is ascending. The angle of downwash may be regarded as a function of the angle of attack, and in fact may be indirectly determined from the angle of attack uncorrected for downwash, for the angle of downwash produced by an airfoil has been found experimentally to be in effect a function of the lift coefficient, which for each airfoil is a well established function of the angle of attack, so that each true angle of attack has its corresponding angle of downwash and consequently its corresponding uncorrected angle of attack, and conversely each uncorrected angle of attack its corresponding angle of downwash, and corrected angle of attack. In fact the lift coefficient may be considered as a function of the uncorrected angle of attack, that is of the true angle of attack plus angle of downwash, and it will vary with this angle in substantially the same manner as with the true angle of attack, except that it takes a slightly greater angular difference to produce each difference in lift coefficient.

The above equation may therefore be rewritten as: Uncorrected angle of attack=angle of attack+angle of downwash=incidence angle+ angle of relative wind, which indicates that lift coefficient=function of (incidence angle+angle of relative wind). It is a fundamental relation of aerodynamics that the lift exerted by an airfoil may be very well expressed as follows: Lift=lift coefficient×area of airfoil×velocity². It therefore follows that for a given airfoil moving at a given speed lift=function of (incidence angle+angle of relative wind).

Since for uniform motion all forces must be inequilibrium, then for any kind of helicopter performance, whether climbing, hovering, or descending vertically, the relationship lift=weight of craft must be satisfied except when the craft is changing its rate of vertical movement.

The weight of craft being substantially constant, it therefore follows that

Incidence angle+angle of relative wind must remain substantially constant or be compensated for by changes of velocity, and, of course, changes of velocity cannot compensate for changes in the sum of the angles sufficient to produce a change in the algebraic sign of the lift coefficient. In fact, the range of angular changes for which changes of velocity can practically compensate is comparatively limited.

*Factors affecting required blade angles*

For instance consider a blade element at 10-foot radius from the rotor shaft revolving at 120 revolutions per minute, thus giving the element a rotational speed of 125.66 feet per second. If then the craft should descend at 20 feet per second the angle of relative wind would be the angle whose tangent is 20÷125.66 or 9° 03'. Similarly, if ascending at 20 feet per second the angle of relative wind would be —9° 03'. Therefore for the craft to descend uniformly at 20 feet per second with the rotor turning 120 R. P. M. would require an incidence angle 18° 06' different from that required for the craft to ascend uniformly at 20 feet per second with the same rotor speed. Suppose by way of illustration that at this rotor speed an angle of attack of +2° is necessary to sustain the craft. With a typical rotor arrangement a true angle of attack of +2° is found to give an angle of downwash of 3° 05' making the angle of attack uncorrected for downwash +5° 05'. Therefore for climbing at 20 feet per second under the particular conditions outlined an incidence angle of 5° 05'+9° 03'=14° 08' would be required, while for descending at 20 feet per second the required incidence angle would be 5° 05'—9° 03'=—3° 58'.

From the foregoing numerical example it will be evident that it is impossible to design a rotor with constant incidence angle that will be satisfactory both for ascent at considerable speeds and for powerless descent, for though, as previously mentioned, a rotor may autorotate under certain conditions at incidence angles up to at least +4° or +5° maximum safety makes it desirable to have available the possibility of lower incidence angles, as hereafter explained, while to secure any climb with the particular figures assumed steeper incidence angles would be necessary.

Without following through numerical illustrations in detail it will be evident that an increase in rotor speed will decrease the angle of relative wind for a given speed of ascent or descent and therefore reduce the amount of change of incidence angle corresponding to a given change in rate of climb. It will also, of course, decrease the true angle of attack required since at the increased velocity a less lift coefficient will be required to produce a lift equal to the weight of the craft. Hence if the above numerical example had been carried through for a higher rotor speed the mean of the two incidence angles, which equals the uncorrected angle of attack, would have been a little smaller, and the departure of each incidence angle from the mean, which equals the angle of relative wind, would have been considerably less, resulting in a marked decrease of the angle required for climb and a slight increase of that required for descent. It will similarly be evident that for a given rotor speed, the departures of required incidence angles from the mean will be substantially proportional to the rates of climb or descent.

Obviously, then, the incidence angles required for efficient climb are considerably steeper than those required for descent, and are themselves subject to considerable variation with rotor speed and rate of climb, the required incidence angle decreasing with increase of rotor speed, and increasing with increase of rate of climb. The manner in which my rotor adjusts itself automatically with changes in rotor speed and rate of climb to substantially the most efficient incidence angles will be described hereinafter.

*Autorotation of rotor*

It has been determined by experiment that a rotor having blades hinged to it at fixed incidence angles within a certain critical range, as for instance 0° to +5°, will, if subjected to an upward airstream and if initially rotated above a certain unstable critical speed be autorotative tending to turn at a certain higher stable critical speed, while if subjected to the same airstream but not initially rotated above the unstable critical speed will stall. The reason for this phenomenon will be evident from the theoretical considerations relative to rotor performance previously mentioned, together with certain other well known aerodynamical facts.

For instance, assuming again a blade element at ten foot radius from the rotor axis, and a speed of descent of 20 feet per second, the blade having a fixed incidence angle of +3°, the following would represent a typical set of conditions:

Column A=rotor speed in revolutions per minute.

Column B=angle of relative wind=$\cot^{-1}\dfrac{\pi}{60}\times$column A.

Column C=corresponding uncorrected angle of attack=col. B+3°.

Column D=corresponding angle of downwash.

Column E=corresponding true angle of attack=col. C−col. D.

Column F=angle of resultant aerodynamic force forward from perpendicular to chord for typical airfoil at angle of attack column E.

Column G=angle of resultant aerodynamic force forward from parallel to rotor axis=column F−3°.

| A | B | C | D | E | F | G |
|---|---|---|---|---|---|---|
| R.P.M. | ° ′ | ° ′ | ° ′ | ° ′ | ° ′ | ° ′ |
| 140 | 7 46 | 10 46 | 4 40 | 6 06 | 2 35 | −0 25 |
| 127.3 | 8 32 | 11 32 | 4 52 | 6 40 | 3 00 | 0 00 |
| 120 | 9 03 | 12 03 | 5 01 | 7 02 | 3 17 | +0 17 |
| 100 | 10 49 | 13 49 | 5 27 | 8 22 | 4 17 | +1 17 |
| 80 | 13 26 | 16 26 | 6 03 | 10 23 | 5 45 | +2 45 |
| 60 | 17 39 | 20 39 | 6 43 | 13 56 | 8 10 | +5 10 |
| 47.5 | 21 54 | 24 54 | 6 04 | 18 50 | 3 00 | 0 00 |
| 40 | 25 31 | 28 31 | 5 47 | 22 44 | 0 50 | −2 10 |
| 20 | 43 41 | 46 41 | 6 28 | 40 13 | −0 47 | −3 47 |

When the resultant aerodynamic force acts forward from a parallel to the rotor axis it, of course, tends to speed up the rotor and make it autorotative, while when it acts back from such a line it tends to slow down the rotor. It will be noted that in the above tabulated case, the rotor will tend to slow down if rotating more than 127.3 R. P. M. or less than 47.5 R. P. M., while it will tend to speed up if rotating at a speed intermediate between these two speeds. When rotating at exactly 47.5 or 127.3 R. P. M. and descending at 20 feet per second the resultant aerodynamic forces of the rotor assumed will be exactly parallel to the rotor axis and therefore exert no tendency to speed up the rotor or to slow it down. The unstable critical speed previously referred to is, in this instance, 47.5 R. P. M., since if it rotates faster than this speed the aerodynamic forces will tend to make it speed on up to 127.3 R. P. M., while if it rotates less than this speed it will tend to slow down until it stops. 127.3 R. P. M. is the stable critical speed, since if rotating faster than this it tends to slow down, while if rotating slower it tends to speed up.

The range of speeds within which the rotor will tend to speed up changes rapidly with changes in the incidence angle. Since for the airfoil assumed the maximum forward angle the resultant aerodynamic force may make with the perpendicular to the airfoil chord is approximately 8°, if the incidence angle were increased to 8° there would only be a very small range of speeds within which the rotor would self-rotate, as a speed of rotation bringing the true angle of attack much above or below 14° would reduce the angle of the resultant force forward from the perpendicular to the chord to less than 8°, thus leaving it back of the parallel to the rotor axis. Similarly if the incidence angle were decreased to −1° the rotor would be self rotating at all speeds covered by the preceding table since at all angles of attack shown the resultant aerodynamic force never falls more than 1° back of the perpendicular to the airfoil chord.

The actual range of incidence angles within which an entire blade is self rotating is considerably less than that for an element of the blade at a fixed radius from the rotor axis, since the blade is composed of a series of elements at different radii and therefore at different angles of attack. Thus at different points along a blade the aerodynamic forces make different angles with the airfoil chord, the most forward, for the airfoil assumed, being slightly over 8° forward of the perpendicular to the chord. The resultant aerodynamic force will make an angle with the airfoil chord which will be an average of the angles of the forces on the various elements of the blade weighted in proportion to the relative size of the respective forces, which varying as the areas of the element and the squares of their respective velocities are, in general, increasingly important toward the outer end of the blade. It is thus possible to secure resultant aerodynamic forces over entire blades which make angles roughly varying from 5° forward of the perpendicular to the airfoil chord to approximately on the perpendicular.

For safe powerless descent it is essential that the rotor be self rotating. Assuming as a representative instance the values mentioned above it is evident that for incidence angles above +5° the rotor will not be self rotating at all, while for incidence angles safely below 0° it will be self rotating under all conditions, and for incidence angles intermediate between these two values it will be self rotating if the rotor is initially rotating above a certain range of critical speeds, but if for any reason the rotor should be slowed below this critical range it will stall.

Since the positive angles of incidence give much greater lift and consequently slower descent than the negative angles under anything like similar conditions it would be desirable to have the rotor blades, in case of powerless descent, automatically assume positive incidence angles close to the maximum giving autorotation, but in case the rotor should start to slow down automatically readjust themselves to lower incidence angles, including rendering the angles actually negative if necessary to insure continued rotation of the rotor. The manner in which my rotor thus readjusts itself automatically is described hereinafter.

For these purposes, I have provided a structure permitting either powered or free rotation of a rotor especially designed to automatically adjust itself, in either type of operation, to a condition closely adapted to the requirements above set forth.

NOVEL TYPE OF ROTOR

Hinge arrangement

In Figs. 1, 5 and 6, a rotor hinge arrangement is illustrated, the principal distinctive feature of which is that each hinge 3 is inclined at an acute angle to the blade axis and at an angle to its plane of rotation. More specifically the forward end of the hinge is inclined upwardly and outwardly with respect to the blade, so that the blade instead of maintaining substantially a constant angle of incidence at various flapping angles, will have a considerable positive angle of incidence when the blade extends out perpendicular to its shaft, but the incidence angle will continuously decrease as the blade is rotated upwardly about its hinge, even becoming a negative incidence at large flapping angles. The dotted curve in Fig. 7 illustrates the variation of incidence angle with flapping angle for a typical rotor of this type in which the blade hinge makes an angle of 35° with the blade axis and 13° with the plane of rotation.

Figs. 5 and 6 illustrate in detail one possible embodiment of my proposed hinge arrangement, in which each hinge 3 includes a hinge pin 61 and two hinge units 62 and 63, the former near the forward end and the latter near the rear end of the hinge pin. All units 62 will be at the same level and same radial distance from shaft 4, and for their support I provide a flange 64 rigid with shaft 4, which flange may be either a solid flange or a skeleton framework adapted to support the hinge units and covered with whatever shielding may give it the minimum of air resistance. Hinge units 63 being all at a certain lower level than hinge units 62 are arranged to be supported on a second flange 65, similar in general arrangement to flange 64, but different in shape. It will be noted that with the leading edge of each blade or a line in advance thereof, intersecting the rotor axis, as illustrated, and with unit 62 as close in to shaft 4 as illustrated, each lower rear hinge unit 63, though farther in from the outer tip of its blade than unit 62, is nevertheless farther from shaft 4, thus requiring that flange 65 extend to greater radial distances from shaft 4 than flange 64. Obviously the relative maximum radii of the two flanges and the shape of each will vary with changes in the relative positions of the hinges either forwardly or radially, but the general arrangement of supporting each hinge axis at two or more points by supports rigid with rotor shaft 4 can be followed.

Performance of such a rotor

With any such hinged blade rotor each rotor blade always tends to assume the flapping angle which will place in equilibrium the forces tending to move it about its hinge, these forces being principally centrifugal force and aerodynamic lift. The general manner in which the rotor blades automatically readjust themselves to the various conditions of flight with my particular hinge arrangement will be evident from the following considerations:

Assume a craft about to take off vertically. The rotor blades, being supported at or near 0° flapping angle by wires 2a are standing at so steep an incidence angle that a very low rotor speed the moment of the lift exceeds the blade weight and they start to rotate upward about their hinges. As they rise above their hinges centrifugal force, in addition to the weight of the blades, is effective to tend to rotate them downward about their hinges, while the aerodynamic lift is effective to tend to rotate them upward. As the blades swing upward the downward moment of the centrifugal force increases rapidly since the moment arm is proportional to the sine of the upward angle, and the effective radius, varying as the cosine of the same angle, changes very little at the lower flapping angles ordinarily encountered. The upward moment of the aerodynamic lift decreases almost equally rapidly with increase in flapping angle, since incidence angle decreases in almost direct proportion to increase of flapping angle within the usual working range, and within such range lift coefficient is almost directly proportional to angle of attack, which with the craft stationary is substantially proportional to incidence angle. Hence with the downward moment of centrifugal force thus increasing and the upward moment of the aerodynamic forces decreasing with increase of flapping angle, the flapping angle at which equilibrium will be found is sharply defined, and a strong moment is effective to resist any displacement of the blade from such angular position.

If the hinge arrangement is such as to give the blades a fairly high incidence angle when extending horizontally outward from the mast, a fairly high lift will be found to exist on the blades at this equilibrium angle for the very high lift that would result from rotation of the rotor with the initially high incidence angle mentioned can only be reduced by allowing the blades to rotate upward so as to decrease the incidence angle, but since such upward rotation can only be made in opposition to the rapidly increasing downward moment of centrifugal force, the lift cannot decrease below the value necessary to counterbalance the downward moment of centrifugal force. In the case of the rotor for which performance curves are given in Fig. 7, it will be noted that as the flapping angle first commences to increase about 0°, that the moment of the aerodynamic forces effective with the craft stationary ($U=0$), increases rather than decreases. This is because at 0° flapping angle, the incidence angle is somewhat above 23° and gives a true angle of attack distinctly above that giving maximum lift. Approximately 1° 30' raising of the blades, however, allows the incidence angle to decrease to a point giving a true angle of attack of 14°, after correcting for downwash, which angle gives the maximum lift coefficient for the particular airfoil assumed. Further increases in the flapping angle then cause decreases in the lift and in the upward moment of the aerodynamic forces, but before the lift decreases to half of its maximum value, the moment of the centrifugal force has risen to the point producing equilibrium (as at B, Fig. 7, when $n$, rotor revolutions per second, $=3$) which brings the angle of attack within the range giving most efficient operation.

*Incidence angle requirements in vertical flight*

While at first glance it may seem that the most efficient operation would be found with the blades functioning at the angle of attack for which the lift-drag ratio (L/D) is a maximum, such is not generally the case under actual working conditions, as will be evident from the following analysis. The following three formulas are well established in aerodynamics.

(1) $HP = \dfrac{DV}{375}$ (2) $D = K_x AV^2$ (3) $L = K_y AV^2$

In which:
HP = horsepower required.
D = aerodynamic drag in pounds.
L = aerodynamic lift in pounds.
V = airfoil velocity with respect to air in miles per hr.
A = airfoil area in square feet.
$K_x$ = drag coefficient.
$K_y$ = lift coefficient.

Substituting in (1) value of D from (2) and then value of V from (3)

$$HP = \dfrac{1}{375} K_x A \left(\dfrac{L}{K_y A}\right)^{3/2} = \dfrac{1}{375} \sqrt{\dfrac{L^3}{A}} \times \dfrac{K_x}{K_y^{3/2}}$$

Since in a given craft A is ordinarily fixed, and for all uniform conditions of flight the sum of L from all airfoils equals the weight of the craft, and will therefore be a constant for symmetrical rotor conditions such as pertain to all conditions of vertical flight, the horsepower required varies as $K_x/K_y{}^{3/2}$, or inversely as $$\dfrac{L}{D}\sqrt{K_y}.$$

For a typical airfoil for which maximum L/D occurs near 1° angle of attack and maximum $K_y$ near 14° angle of attack horsepower requirements are found to reach a minimum at about 6° angle of attack, but instead of getting rapidly poorer with small changes in the angle of attack, as is the case with L/D, the horsepower requirements are almost equally low from 2° to 6° and only increase slightly at angles of attack up to 8° or 10°. As an illustration of the manner in which my rotor takes advantage of this most efficient range of angles of attack, the incidence angle for point B, Fig. 7, is 7° 55′, which after correcting for downwash gives a true angle of attack of 4° 03′, which for the airfoil described above lies at the middle of the most efficient angles of attack.

*Automatic adjustment of incidence angles with craft stationary or climbing vertically*

Since under most typical conditions the moment of the blade weight is very slight in comparison with those of the aerodynamic and centrifugal forces, and since the two latter moments are both proportional to square of rotational velocity if the craft is not moving, the flapping angle will change but little with changes in rotor speed. In Fig. 7 points A, B, and C represent the conditions for blade equilibrium at rotor speeds of $n=4$, $n=3$, and $n=2$ respectively, and it will be noted that though the moments involved differ by several hundred percent the flapping angle of equilibrium varies by less than 1°.

As the rotor is speeded up the lift will increase substantially in proportion to the square of rotor speed until it equals the weight of the craft. As soon as it exceeds such weight the difference is effective to give the craft an upward acceleration. As soon as it commences to move upward, however, the angle of attack (uncorrected) on each blade element will be decreased by the angle of relative wind thus established for each respective blade element, which for vertical flight is the angle whose tangent is the rate of vertical movement divided by the rate of rotational movement. These decreases in angles of attack will cause decreases in lift which, however, cannot cut the net lift below the weight of the craft or the upward velocity causing the decreases will diminish thus tending to reduce the decreases and increase the lift. As previously outlined, if the incidence angles of the blades are constant there is a very close limit on the angles of climb possible before the angles of relative wind increase to a point cutting the average effective angles of attack too low to support the weight of the craft at any attainable rotor speed. With my rotor, however, the incidence angles increase with each increase in rate of climb thus leaving the angles of attack more nearly uniform. The manner in which this is accomplished will be evident if we consider the rotor at any two rates of climb but at the same rotor speed. At the lesser rate of climb a certain flapping angle will produce equilibrium. If, however, the rotor were to be operated at the same flapping angle and rotor speed at the greater rate of climb, the upward moment of the aerodynamic forces would be decreased owing to the reduction in angle of attack while the downward moment of the centrifugal force would maintain its former value, thus creating a net downward moment effective to decrease the flapping angle and increase the incidence angle.

Since the angles of relative wind at given rates of climb will be greater at lower rotor speeds, greater increases of incidence will be necessary to re-establish equilibrium. It will be noted in Fig. 7 that points D, E and F which represent equilibrium conditions with the craft climbing 20 feet per second and the rotor revolving at 4, 3, and 2 revolutions per second, respectively, reflect this condition, the flapping and corresponding incidence angles being as follows:

| Point | Rotor speed | Flapping angle | Incidence angle |
|---|---|---|---|
| | | ° ′ | ° ′ |
| D | 4 | 8 53 | 11 10 |
| E | 3 | 7 43 | 12 36 |
| F | 2 | 5 35 | 15 18 |

Earlier in this discussion it was established that for efficient climb incidence angle should decrease with increase of rotor speed and increase with increase of rate of climb and it is now evident that this is automatically accomplished in my rotor.

*Automatic adjustment of incidence angles in vertical descent*

When the craft is descending the angle of relative wind is effective upward instead of downward, serving to increase the angle of attack and the lift instead of to decrease them. In case of descent the angle of relative wind for each blade element is the angle whose tangent is $$\frac{\text{rate of descent}}{\text{rotational velocity of element}},$$

which increases with the rate of descent and decreases with increase of rotor speed. Hence any increase in the rate of descent at a given rotor speed will increase the angle of relative wind, the angle of attack, and the lift, requiring a higher flapping angle and lower incidence angle for equilibrium. Also any decrease in rotational speed will cause a similar increase in the angle of attack requiring also a higher flapping angle and consequently lower incidence angle for equilibrium.

It will be noted in Fig. 7 that points G, H, and I which represent equilibrium conditions with the craft descending 20 feet per second and the rotor revolving at 4, 3, and 2 revolutions per second, respectively, show clearly this decrease of incidence angle with decrease of rotor speed, the values being as follows:

| Point | Rotor speed | Flapping angle ° ′ | Incidence angle ° ′ |
|---|---|---|---|
| G | 4 | 15 00 | 3 15 |
| H | 3 | 15 27 | 2 40 |
| I | 2 | 17 03 | 0 25 |

Comparison of these incidence angles with those previously given for vertical climb indicate how ideally the rotor has readjusted itself from climbing to descending conditions.

*Autorotation in powerless descent*

There is nothing in the analysis thus far to indicate whether or not the rotor is self-rotating under the various specific equilibrium conditions assumed, but it may be of interest at this point to note that the total lift and horsepower required for each of the equilibrium conditions indicated in Fig. 7 has been computed on the basis of summation of the forces acting on the various blade elements for a four-bladed rotor having fifteen foot blades with Clark Y airfoil, giving the following results:

| Point | Rotor speed rev. per sec. | Speed of ascent ft. per sec. | Flapping angle ° ′ | Incidence angle ° ′ | Lift lbs. | H. P. required |
|---|---|---|---|---|---|---|
| A | 4 | 0 | 11 50 | 7 37 | 8330 | 456.0 |
| B | 3 | 0 | 11 34 | 7 55 | 4600 | 194.5 |
| C | 2 | 0 | 11 07 | 8 30 | 1963 | 59.7 |
| D | 4 | 20 | 8 53 | 11 10 | 6400 | 537.0 |
| E | 3 | 20 | 7 43 | 12 36 | 3150 | 227.6 |
| F | 2 | 20 | 5 35 | 15 18 | 1023 | 66.5 |
| G | 4 | −20 | 15 00 | 3 15 | 10270 | 211.0 |
| H | 3 | −20 | 15 27 | 2 40 | 5900 | 54.6 |
| I | 2 | −20 | 17 03 | 0 25 | 2825 | −10.6 |

From the required horsepowers it is evident that the particular rotor assumed is only self-rotating in the last case, namely when descending 20 feet per second and the rotor revolving at 2 revolutions per second. Incidentally this agrees well with the study of the autorotation of a single blade element at 10 foot radius, and a fixed incidence angle of +3°, as set forth earlier in these specifications, wherein the element was found to be self-rotating up to speeds 127.3 R. P. M. when descending 20 feet per second. In the present instance the −10.6 horsepower requirement at 120 R. P. M. indicates that 10.6 horsepower is effective to drive the rotor up to more than 120 R. P. M., with accompanying flattening of flapping angle and increase of incidence, and therefore with reduction in rate of descent if there is to be no change in weight of craft and therefore no change in lift. While the horsepower requirements for higher rotor speeds with the craft descending 20 feet per second are seen to mount rapidly, it will be noted that the corresponding lifts exerted also mount rapidly, so that for a given weight of craft, as for instance the 2825 pounds supported in case I, instead of such rapid increase of power requirements we would actually encounter reductions in the speed of descent.

In fact for any given weight of craft, the negative horsepower effective within the self-rotating range is available to speed up the rotor and reduce the rate of descent to the lowest powerless rate obtainable with the specific rotor and craft. The speeding up of the rotor and decrease in speed of descent will both act to decrease flapping angle and increase incidence angle in the manner previously outlined until the point is reached at which any change in these variables would leave the rotor no longer self-rotating. While with a fixed-incidence rotor it would be dangerous to attempt to secure so low a rate of descent by setting such high incidence angles, it cannot be so with my rotor, for as soon as anything causes the rotor to slow down or the rate of descent to increase, the flapping angle at once increases and the incidence angle decreases until self-rotation is restored, even if this should require reducing the incidence angle into the negative range within which the rotor is always self-rotating with a descending craft, for unless the rotor continues to rotate at so high a speed that centrifugal force will prevent, the blades will rise until the incidence angles become negative. Therefore, the stalling of my rotor is impossible, and when self-rotating it automatically drives itself up to the most efficient self-rotating conditions giving the minimum rate of descent of the craft. Thus the rotor ideally adapts itself to powerless descent as well as controlled descent or ascent with power applied to the rotor.

*Automatic adjustment of incidence angles in forward flight*

Considering next the functioning of the rotor in forward flight, the effect of the forward velocity is, of course, to increase the velocity of the air with respect to the blades on the side of the craft on which the rotational velocity is forward, and to correspondingly reduce the effective velocity on the other side of the craft. Since these changes in effective velocity are not, as in the case of vertical flight, accompanied by corresponding changes in centrifugal force, they are actually effective to change the flapping angle of the blades. At a given angle of attack the lift increases as the square of the effective velocity. If the incidence angle did not change, the flapping angle would (since the centrifugal force varies as the cosine of the flapping angle) increase at a rate keeping its sine substantially proportional to the square of effective velocity, but since such increase in flapping angle is necessarily accompanied by decrease in incidence angle neither the increase in flapping angle nor that in lift are as great as would otherwise be the case. However each increase in the velocity will give an increase in lift, for the increase in lift can only be less than proportional to the square of velocity by virtue of the increase in flapping angle, and such increase can only be maintained at any given rotor speed by an actual increase in lift on the blade proportional to that in the sine of the flapping angle. Therefore in forward flight no blade can be raised so high as to reduce the true angle of attack so low as to reduce the lift exerted by it below that exerted by blades simultaneously working at lower flapping angles.

In fact at any given rotational speed each blade will be exerting a lift substantially proportional to the sine of its flapping angle, and both lift and flapping angle will be greatest where the effective velocity of the blade with respect to the air is greatest. Hence in forward flight the blade will tend to assume its highest flapping angle at the middle of the advancing side of the rotor, and its least at the middle of the receding side. A blade directly forward or back will stand at a flapping angle substantially the same as would be the case without forward movement, while those at the sides will stand above and below such angle by amounts depending primarily on the ratio of forward speed to rotational speed. Each blade will thus pass during each cycle through the entire range of flapping angles, substantially as in the case of the present well known "Autogiro" rotor, but instead of the incidence remaining constant throughout the cycle, as with the "Autogiro", it is constantly varying, the advancing blade having the least angle of incidence, the lowest lift and drag coefficients, but the highest total lift, and as a rule the highest ratio of lift to drag, while the receding blade has the highest angle of incidence, highest lift and drag coefficients, the lowest total lift, and as a rule the lowest ratio of lift to drag.

The fact that the blade having the lowest velocity and lowest total lift has the highest lift coefficient, while that having the highest total lift has the lowest lift coefficient tends to keep the differences of lift and of flapping angle much smaller than would otherwise be the case. This combined with the fact that the blade having the highest total lift has the highest lift-drag ratio, means that the drag on the advancing side is kept down comparable with that on the opposite side. If the rotational velocity of the outer portion of the blade is allowed to fall below the forward velocity of the craft, a negative velocity will be effective on the outer portion of the receding blades, which with the high drag coefficient effective at the low flapping angle of that blade, can easily be brought to a point producing self-rotation of the rotor. As this would however involve negative lifts, the blades would have to be so arranged as to be capable of assuming negative flapping angles, or the stability of the craft would be endangered. The extent to which such an arrangement might prove practicable would depend largely upon the general configuration of the craft. In any case the gain by providing for complete self-rotation of the rotor in horizontal flight is comparatively slight, if any, as the horsepower required by the tractor propellers can be brought very much lower than would be required with a self-rotating rotor, thus keeping the total horsepower requirements almost as low, or even lower, than would be the case were the rotor completely self-rotating.

In order to assure autorotation under all flight conditions in the early forms of the Cierva machine known under the trade name "Autogiro", that craft was flown with its rotor axis tilted back substantially from the direction of flight so that the airstream would have a considerable component in the upward direction of the rotor axis. The result, in some machines, was that the rotor lift had a considerable component opposite to the propeller thrust, so that it was impracticable to approximate the most favorable lift-drag and power-lift ratios obtainable with the airplane. My craft, on the other hand, can fly with its rotor axis perpendicular to the airstream, so that none of the rotor lift opposes the propeller thrust, and even the drag of the rotor blades due to forward velocity helps to rotate the rotor except in the case of the advancing blades for which the lift-drag ratios are the most favorable attainable, exceeding those of the airplane under cruising conditions.

It is noteworthy that while in the "Autogiro" the majority of lift is exerted by the blades having the steepest angle of attack, with my craft the great majority is exerted by blades operating at the least angle of attack and the highest attainable lift-drag ratios, with the remainder exerted by blades operating at higher lift coefficients.

*Incidence angle requirements in forward flight*

It was earlier shown, in connection with vertical flight, that horsepower required was expressed by the following formula:

$$H.P. = \frac{1}{375}\sqrt{\frac{L^3}{A}} \times \frac{K_x}{K_y^{3/2}}$$

So long as all airfoils under consideration are functioning at the same angle of attack and same effective air speed under which conditions (with airfoil areas equal) each must assume the same constant proportion of the weight of the craft, as was the case in vertical flight, L may be considered a constant, leading to the conclusion, as in the case of vertical ascent, that greatest efficiency will occur with minimum $$\frac{K_x}{K_y^{3/2}}$$

In the case of forward flight, however, the air speeds on the different blades vary greatly, that on the advancing blade ordinarily being several times as great as that on the receding blade. For a given blade area and angle of attack the lift increases as the square of the effective aerodynamic velocity and the horsepower required as the cube. Therefore with the horsepower on the advancing blade increasing so much more rapidly than the lift, and the horsepower and lift on the receding side correspondingly decreasing, it would prove economical to decrease the lift and horsepower on the advancing blade and increase those on the receding blade by decreasing the angle of attack of the former and increasing that of the latter.

For instance, with the rotation speed ($V_R$) of a set of blade elements 1.5 times that of the forward speed ($V_F$) of the craft, the air speed of the advancing blade element when at right angles to the axis of the craft is $V_R - V_F = 2.5 V_F$, while that of the opposite receding blade element is $V_R - V_F = 0.5 V_F$, making the effective aerodynamic velocity of the advancing element 5 times that of the receding element. If the two blade elements are aerodynamically similar, and they should both function at the angle of attack giving minimum $K_x/K_y^{3/2}$, the lift of the advancing element would be 25 times that of the receding element and its horsepower requirement 125 times that of the latter. Obviously economy would result from dropping the angle of attack of the advancing blade nearer to that giving minimum $K_x/K_y^{3/2}$, and increasing that of the receding blade correspondingly. To illustrate how this works out in a typical case, assume a Clark Y airfoil with minimum $K_x/K_y^{3/2}$ at about 6° and minimum $K_x/K_y$ at about 1° angle of attack, and the ratio of $V_R$ to $V_F$ as above. With a four bladed rotor considered at the instant two blades are parallel with the axis of the craft and two perpendicular, the following table indicates the values of lift and horsepower, first with all blades functioning at 6° angle of attack, the most efficient angle in case of vertical ascent, and second with the angle of attack of the advancing blade reduced to 2° and that of the receding blade increased to 10°:

| | Advancing blade | Forward blade | Receding blade | Backward blade | Total |
|---|---|---|---|---|---|
| Velocity | $2.5 V_F$ | $1.5 V_F$ | $0.5 V_F$ | $1.5 V_F$ | |
| Lift | $6.25 K_y AV_F^2$ | $2.25 K_y AV_F^2$ | $0.25 K_y AV_F^2$ | $2.25 K_y AV_F^2$ | |
| Horsepower | $\frac{15.625}{375} K_x AV_F^3$ | $\frac{3.375}{375} K_x AV_F^3$ | $\frac{0.125}{375} K_x AV_F^3$ | $\frac{3.375}{375} K_x AV_F^3$ | |
| Angle of attack | 6° | 6° | 6° | 6° | |
| $K_y$ | .00213 | .00213 | .00213 | .00213 | |
| $K_x$ | .00013 | .00013 | .00013 | .00013 | |
| Lift | $.01331 AV_F^2$ | $.00479 AV_F^2$ | $.00053 AV_F^2$ | $.00479 AV_F^2$ | $.02342 AV_F^2$ |
| H. P. ×10⁵ | $.542 AV_F^3$ | $.117 AV_F^3$ | $.004 AV_F^3$ | $.117 AV_F^3$ | $.780 AV_F^3$ |
| Lift per H. P. | | | | | $3003/V_F$ |
| Angle of attack | 2° | 6° | 10° | 6° | |
| $K_y$ | .00140 | .00213 | .00279 | .00213 | |
| $K_x$ | .00007 | .00013 | .00022 | .00013 | |
| Lift | $.00875 AV_F^2$ | $.00479 AV_F^2$ | $.00070 AV_F^2$ | $.00479 AV_F^2$ | $.01903 AV_F^2$ |
| H. P. ×10⁵ | $.292 AV_F^3$ | $.117 AV_F^3$ | $.007 AV_F^3$ | $.117 AV_F^3$ | $.533 AV_F^3$ |
| Lift per H. P. | | | | | $3570/V_F$ |

It will be observed that for a given $V_F$ the lift per horsepower is 19% greater in the second instance than in the first. However the practical problem ordinarily encountered involves keeping the total lift of the rotor substantially constant and adjusting $V_R$ as may be required to do this. In the present illustration in which the ratio of $V_F$ to $V_R$ has been assumed constant for purpose of comparison this involves adjusting $V_F$ to give constant lift. Designating $V_F$ in the first instance as $V_{F1}$ and that in the second instance as $V_{F2}$, for constant lift $$V_{F2} = \sqrt{\frac{.02342}{.01903}} V_{F1}$$

making the lift per horsepower in the second instance equal $3218/V_{F1}$, indicating that 7% less horsepower is required to produce a given lift in the second instance than in the first instance.

From the previous description of the action of my rotor in horizontal flight it will be obvious that the blades automatically readjust themselves in substantially the manner indicated in the second instance above. Hence my type of rotor is adapted to not only automatically readjust itself into the most efficient condition for vertical climb or descent, either with power on or without, and for maximum safety in the latter case, but it automatically readjusts itself to permit of maximum efficiency in horizontal flight.

Lateral and longitudinal stability

The question may be raised whether, with the blade hinges turned at sharp angles to their respective blade axes instead of being at right angles to same as in the autogiro rotor, unbalanced conditions may not be set up capable of endangering the lateral or longitudinal stability of the craft. Under all conditions of vertical flight the conditions surrounding each of the blades are identical, so that it can only be as the craft acquires translational velocity that any unbalancing would be possible, under which conditions the usual control surfaces are effective to counter-balance a reasonable degree of unbalancing. The resultant force exerted by each blade on the rotor axis is a tension substantially in line with the blade axis except as it may be offset therefrom due to the rotor driving torque. From the details of rotor construction illustrated in the accompanying figures it is evident that the hinges may, without difficulty, be so constructed as to bring the blade axis into a position to normally intersect the rotor axis, or any reasonable amount desired to either side of such a position. Computations of various typical operating conditions indicate that with the most unfavorable combination of driving torque, centrifugal force, and forward velocity the blade tensions are only displaced a small fraction of a foot from self-rotating conditions, and this taking place only when the forward velocity renders the ailerons and elevators effective for control indicates that these control surfaces will have much less variation to compensate for than in the shifting of center of pressure on an airplane wing. In fact with the maximum shifts as small as they are, and the point of support as far above the center of gravity as it is, only comparatively slight tilting out of plumb would take place if no correction were set up by the control surfaces. Hence neither the lateral or longitudinal stability of the craft can be endangered, and even such slight tilting as might take place can, if desired, be eliminated by use of the usual control surfaces.

Alternative rotor with blade incidence responsive to torque changes

In order to obtain maximum performance under the greatest variety of conditions comparatively sharp angles between the hinge and blade axes are required. For instance, referring to Fig. 7, had a flatter angle been assumed, the change of incidence angle per degree change of flapping angle would have been less, resulting in the curves for "moments of aerodynamic forces" being correspondingly flatter. These flatter curves would all intersect the curves as shown at whatever flapping angle the incidence angles of the two cases assumed were identical. For instance if the inclination of the hinge axes to their plane of rotation were such that this equality of incidence angles applied to point B, Fig. 7, the new flatter incidence curve would cross that shown on the vertical through point B, and each of the new flatter curves for aerodynamic moments would cross the corresponding curves shown on the same vertical. Hence points C, D, E and F would be at lower flapping and incidence angles giving lower lifts and horsepowers while points A, G, H, and I would be at higher angles giving higher lifts and horsepowers. Therefore higher rotor speeds would be required to produce a given lift for vertical climb, which with horsepower increasing as the cube and lift as the square of speed would mean decreased efficiency. Also greater rates of descent would be required to produce autorotation with given lift, both of which results are undesirable.

Figures 8 and 9 illustrate an arrangement for increasing the difference in incidence angle between steep climb and powerless descent, thus making possible flatter hinge angles or increased efficiency under widely different conditions. This arrangement differs from that illustrated in Figs. 5 and 6 principally in that the hinge axis, instead of being at a fixed angle to the plane of rotation is at an angle automatically varied with variations in rotor driving torque. In the particular arrangement illustrated flanges 64 and 65 instead of directly supporting hinge pin 61, as in the arrangement previously described, support an intermediate frame 66, hinged rearwardly to flange 65 and forwardly to flange 64 along an axis making an acute angle with hinge pin 61, which is in turn supported by frame 66 and hinged at its lower end to an arm 67 rigid with a hub 68 spring pressed upwardly on rotor shaft 4 by spring 69 toward stop collar 70. Since when requiring any considerable driving torque blades 2 are inclined upwardly and rear strut 71 of frame 66 is inclined downwardly, and since to produce a driving torque on the blade compression must be transmitted through strut 71 to the rear portion of the blade, it is evident that there will be a downward force on the rear portion of hinge pin 61 substantially proportional to driving torque, which downward thrust is taken up by spring 69 through arm 67 and hub 68. There will then result a lowering of hub 68 and arms 67 with a consequent steepening of the hinge angle substantially proportional to rotor torque, and conversely when torque is relieved, as in case of engine failure, a corresponding decrease in hinge and blade incidence angles. Thus the arrangement serves to steepen the incidence angle of the blade for climb and flatten it for powerless descent, beyond the amounts it would be steepened or flattened on account of the acute angle between the hinge and blade axes. In fact a very satisfactory rotor could be constructed with hinge axes perpendicular to blade axes, depending entirely on the device automatically responsive to changes in torque for changing incidence angle. Such a rotor would, however, lack some of the advantages of the rotor having blades hinged at an acute angle, particularly in horizontal flight, and powerless descent.

*Novel type of automatic pitch control for propellers*

Either or both of these two means which I use for automatically readjusting the incidence angles of my rotor blades to meet a wide range of conditions can be utilized in a propeller for automatically readjusting its pitch to meet a wide range of conditions. A propeller with fixed pitch like most propellers today in use will be working at maximum efficiency only when advancing at the ratio of air speed to rotational speed which gives an angle of relative wind bringing the angle of attack of the blade elements within the range of maximum efficiency. Comparatively small changes in the speed of the craft will change the angle of relative wind sufficiently to seriously impair the propeller efficiency, while if propeller pitch could be altered by amounts substantially proportional to the angle of relative wind, the propeller could approximate its maximum efficiency over a large range of speeds of advance. Various types of adjustable pitch propellers have been proposed for this purpose, but as illustrated in Fig. 10 the principles of my rotor construction can be applied to a propeller and automatic adjustment of pitch secured.

The propeller of Fig. 10 is substantially the rotor of Figs. 1, 5 and 6 operating on a smaller scale on a horizontal axis. Propeller blades 2 are hinged to shaft 4 through hinge units 62 and 63 supported on flanges 64 and 65 exactly as in the case of the rotor. Since with a horizontal axis the force of gravity does not automatically return the blades to their normal position when idle, extensible members 72 are provided for this purpose. These members, as shown in cross-section in Fig. 11, may include a piston 73 spring pressed by spring 75 to the base of a cylinder 74. Spring 75, like the force of gravity in the rotor, is not powerful enough to have much effect on the propeller blades at high speeds but is sufficient to position them properly as the propeller comes to rest.

With such an arrangement the blades normally stand at a high incidence angle if the propeller is speeded up with the craft stationary under which conditions an ordinary propeller has a very low efficiency the blades will fold forward so as to bring their angle of attack down within the efficient range. As the craft gains speed each tendency for the angle of attack to decrease is accompanied by a straightening out of the blades which increases the incidence angle and tends to hold the angle of attack constant, thus maintaining high efficiency over a wide range of air speeds.

This type of adjustable pitch propeller is, of course, not usable in the craft illustrated in Fig. 1 in place of propellers 8 and 9, as the pitch of these propellers must be subject to exterior control to increase or decrease independently the thrust of each propeller without changing propeller speed in order to control the sum and the difference of the thrusts to meet certain conditions external to the propellers. The propeller illustrated in Fig. 10, and any propeller incorporating either of my means for automatically adjusting blade incidence, is not subject to such external control of pitch and thrust, but automatically adjusts pitch to give substantially the greatest thrust obtainable with the horsepower available. Such a propeller, it will be recognized, is ideal for airplane and other use.

*Summary of operations*

Many of the general operational features of the craft illustrated in Fig. 1 have already been described, but I will now describe a typical sequence of operations. Preparatory to taking off wheel 16 should be turned to the right into its average operating position giving a negative pitch to propeller 9 and positive to propeller 8. The engine throttles may then be opened, allowing both the rotor and propellers to gain speed. As the speed of the rotor increases, the lift exerted by the rotor blades will increase and the pressure of the craft against the ground will decrease, the rotor blades swinging upward early in the process and bringing the blades to an incidence angle giving an efficient angle of attack. While the craft rests heavily on the ground, small differences between the driving torque and the counterbalancing torque set up by the propellers will not cause the craft to rotate because of the heavy ground friction, nor will light wind pressures cause it to move along. As the pressure against the ground decreases, the restraining effect of ground friction becomes less until slightly before leaving the ground the craft may show rotational or longitudinal displacements if the propeller pitches are not such as to exactly counterbalance the torque and wind effects. With the manual control illustrated in Figs. 2 and 3, if at this stage the craft begins to show a tendency to turn to the right, wheel 16 may be turned to the left, and vice versa, while if it shows any tendency to be displaced backward, wheel 17 may be rotated forward, and vice versa, so that if an operator is carefully watching the craft's action as it takes off, he may keep the propellers so adjusted as to avoid any considerable rotational or other horizontal displacement of the craft.

As the craft gains vertical velocity the airstream into which the rotor blades advance assumes a downward angle with respect to the blades, which decreases the lift at a given rotational speed, and therefore decreases the ratio of lift to centrifugal force, causing the flapping angle to decrease and the incidence angle to increase until it is steep enough to give the blade an efficient angle of attack as it advances into the downwardly inclined airstream. This process of readjustment takes place in one direction or another with each change in vertical velocity, each change in the direction of the relative wind meeting the blades being in a large measure offset by a corresponding change in the incidence angle of the blades.

Except when taking off in very restricted space, wheel 17 may be set at the start to give the craft considerable longitudinal propulsion. In any case, after sufficient altitude has been gained to clear surrounding objects, wheel 17 may be rotated forward so as to gradually give the craft an increasing forward speed, which will result in the propellers taking an increased proportion of the engine power, but in a decrease in the power required for driving the rotor. Since under such conditions the great majority of the power of the engines is available for horizontal propulsion, and the aerodynamic drag of the rotor is low, the unusual ability of the craft to climb or descend vertically or to even remain stationary in the air has been obtained with little if any sacrifice of the ordinary performance characteristics of a heavier-than-air craft. There has also been obtained the further advantage of exceptional inherent stability, and safety in case of engine failure, since the rotor supports the craft at the top of shaft 4, while the center of gravity is well toward the bottom of the shaft, and the rotor is self-rotating with the craft descending at a safe speed.

If it is desired to quickly stop the longitudinal movement of the craft, it may be pulled up into a stall by raising the elevator, in the customary manner of airplanes and "Autogiros", or the pitch of the propellers reversed and a back thrust exerted, or preferably by a combination of the two operations. In any case there will be no sudden fall of the craft as the momentum of the rotor will tend to keep it spinning and support the craft, as already demonstrated in "Autogiros", and as the craft commences to fall the air stream will raise the rotor blades thus decreasing the incidence angle into the range of autorotation, whereupon the centrifugal force set up by the autorotation will resist further decreases in incidence angle.

It is evident that with clutch 5 engaged the direction and rate of vertical movement of the craft will, for any given setting of control wheel 17, be mainly dependent on the power output of the engines, and therefore on their throttle setting, for at a given setting of wheel 17 a substantially constant proportion of the power goes to the rotor, and the speed and lift of the rotor depends primarily on the power it is receiving. Thus the vertical movement of the craft may be controlled at will.

It is therefore evident that the craft may be controlled by means of wheels 16 and 17 and the engine throttles, to move in any three-dimensional direction at any speed from absolute stand still to the maximum speed attainable by the craft, and that throughout the craft will be absolutely safe against stall or spin and perfectly controlled in case of engine failure, while either type of rotor disclosed will automatically bring the supporting airfoils into action at substantially the most efficient angles of attack under all conditions of operation.

While the foregoing typical sequence of operations has been based on the manual control illustrated in Figs. 2 and 3, it will be obvious that with the automatic control of Fig. 4, the only difference would be the elimination of necessity to pay attention to wheel 16, its function becoming automatic, thus insuring correct balancing of torque, and leaving the operator free to manipulate wheel 17 and the usual "Autogiro" controls.

The advantages of such a craft, as compared with heavier-than-air craft now in use, are obvious, particularly in taking off and landing in limited areas, as on building roofs, vacant lots, rough fields, small clearings, small lakes or streams, and the like, and in taking off, landing, and travelling in fog or adverse weather. It is also evident that the craft eliminates all of the most frequent sources of airplane accidents, and with its inherent stability and possible low operational speeds is infinitely safer than an airplane in the hands of an untrained operator.

In conclusion it may be well to note that the manner in which my rotor automatically adapts itself to give substantially maximum efficiency and safety under each operating condition to which it is subjected is not accidental, but is due to the fact that the rotor is controlled by the very factors which are of primary importance in the results required.

In powerless operation the requirements are to maintain a certain lift and above all to maintain self rotation of the rotor. The control of the rotor should therefore be sensitive to changes in lift and changes in rotor speed. By controlling the incidence angle of the blade directly by its flapping angle, which is itself a function of the aerodynamic lift and centrifugal force on the blade, it is evident that the control is sensitive to exactly the two factors desired.

In power operation the important consideration is lift per horsepower obtainable under any given set of operating conditions. If therefore the characteristics of the craft are to be automatically altered to give maximum efficiency, or substantially so, the control should be sensitive to the two factors used in measuring efficiency, namely lift and power applied. It has already been clearly shown that the rotor is sensitive to changes in lift. The other immediate factor to which it is sensitive is centrifugal force, and in one form torque applied. Since under any given set of conditions increase in power applied gives increase in rotor speed and hence in centrifugal force, as well as in torque applied, the rotor is, in effect, controlled by lift and power applied.

What I claim is:

1. In aircraft, a rotor system comprising a rotatable blade support, a prime mover, a releasable connection between said prime mover and said support, and blades connected to said support, means rendering said blades adjustable with respect thereto under the influence of a wind having an upward component relative to the system into a pitch condition in which they will be autorotated by said wind, and means rendering said blades adjustable with respect thereto under the influence of said prime mover into a pitch condition in which they would not be capable of rotation by such a relative wind, said blades being of a cambered airfoil shape whereby they exert lift while within said condition of autorotation.

2. In aircraft a rotor system comprising a rotatable blade support, a prime mover, a releasable connection between said prime mover and said support, and blades connected to said support and means rendering said blades adjustable with respect thereto over a range of incidence angles including a zero incidence angle, and an incidence angle substantially above the range of self-rotation, said blades being of a cambered airfoil shape such as to be capable of exerting lift in the zone of self-rotation.

3. In aircraft a rotor comprising a plurality of blades the incidence angles of which may be varied into and out of the range of angles permitting of the autorotation of the rotor by aerodynamic forces in flight, a prime mover selectively engageable with the rotor, and means comprising the connection between the blades and the prime mover for rendering the rotor responsive to the application of power by the prime mover to bring the incidence angles of the blades outside the range permitting autorotation, said connection including pivot means having an axis angularly positioned relative both to the axis of symmetry of the blade and to the axis of the rotor.

4. In aircraft a rotor comprising a plurality of blades the incidence angles of which may be varied into and out of the range of angles permitting of the autorotation of the rotor by aerodynamic forces in flight, a prime mover selectively engageable with the rotor, and means comprising the connection between the blades and the prime mover for rendering the rotor responsive to the cessation of the application of power to the rotor by the prime mover, to bring the incidence angles of the blades within the range of angles permitting such autorotation, said connection including pivot means having an axis angularly positioned relative both to the axis of symmetry of the blade and to the axis of the rotor.

5. In aircraft, a rotor system comprising a plurality of airfoils each so shaped in cross-section that the resultant aerodynamic force thereon may act in a direction making an acute angle with the forward direction of the airfoil chord, a prime mover capable of furnishing power to rotate said system, and automatic means including pivot mechanism for the airfoils responsive to decrease in said power for decreasing the incidence angles of the airfoils into the range within which the resultant aerodynamic forces lie forward of the parallel to the axis of rotation of said system.

6. In aircraft, a rotor system comprising a plurality of airfoils each so shaped in cross-section that the resultant aerodynamic force thereon may act in a direction making an acute angle with the forward direction of the airfoil chord, a prime mover capable of furnishing power to rotate said system, and means responsive to decrease in said power for decreasing the incidence angles of the airfoils into the range within which the resultant aerodynamic forces lie forward of the parallel to the axis of rotation of said system, said means including a hinge connection at an acute angle with the longitudinal axis of each airfoil connecting the airfoil to a common supporting center.

7. In aircraft a rotor comprising a plurality of blades each having an airfoil shape capable, when presented to the air within a certain range of angle of attack, of becoming self-advancing and at the same time developing substantial aerodynamic lift, a prime mover capable of transmitting power to the rotor, and automatic means including obliquely angled pivot mechanism for the blades responsive to variations in the power transmitted to the rotor by the prime mover for altering the angles of attack of the blades into and out of the range within which the blades are self-advancing, said automatic means providing an adjustment range such that, under power, the system is capable of lifting the craft substantially vertically.

8. In a system of the class described, the combination with a rotatable member of a plurality of blades, a hinge connecting each of said blades with said member, the axis of each hinge being inclined, viewed in plan, to the axis of symmetry of the blade, and inclined at an acute angle with respect to the axis of said rotatable member, and means for varying said latter inclination independently of said former inclination.

9. In a system of the class described, the combination with a rotatable member of a plurality of blades, a hinge connecting each of said blades with said member, the axis of each hinge being inclined, viewed in plan, to the axis of symmetry of the blade, and inclined at an acute angle with respect to the axis of said rotatable member, and means automatically operable in response to increases in the resistance offered to the operation of said blades for increasing the incidence angles of the blades by varying said latter inclination independently of the former.

10. In a system of the class described, the combination with a rotatable member of a plurality of blades, a hinge connecting each of said blades with said member, the axis of each hinge being inclined, viewed in plan, to the axis of symmetry of the blade, and inclined at an acute angle with respect to the axis of said rotatable member, and a prime mover releasably connected to said rotatable member, the inclination of the hinge axis being such as to provide an automatic range of adjustment of blade pitch, in flight, which is greater than the range of self-rotation.

11. In a system of the class described, the combination with a rotatable member of a plurality of blades of cambered airfoil shape capable of exerting lift during self-rotation, a hinge connecting each of said blades with said member, the axis of each hinge being inclined, viewed in plan, to the axis of symmetry of the blade, and a prime mover releasably connected to said rotatable member, the inclination of the hinge axis being such as to provide an automatic range of adjustment of blade pitch, in flight, which is greater than the range of self-rotation.

12. In aircraft a rotor system comprising a rotatable blade support, a plurality of blades each tapered in cross-section towards its trailing edge, a hinge in conjunction with each blade making an acute angle with the major axis of the blade and attaching the blade to the blade support, a prime mover, and a releasable connection between said prime mover and said support, the inclination of the hinge axis being such as to provide an automatic range of adjustment of blade pitch, in flight, which is greater than the range of self-rotation.

13. In a system of the class described, the combination with a rotatable member, of a plurality of blades freely hinged to said member for movement with respect thereto independently of each other, the axis of each hinge being inclined, viewed in plan, to the axis of symmetry of its blade, and inclined at an acute angle with respect to the axis of said member, and means for varying said latter inclination.

14. In an aircraft, the combination of an engine, a propeller at each side of the craft, both propellers being driven by said engine, an upright axis, a lifting rotor including a plurality of blades pivotally mounted on said axis, a releasable connection between said engine and said upright axis, and means for differentially varying the thrust of said two propellers.

15. In an aircraft, the combination of an engine, a propeller at each side of the craft, both propellers being driven by said engine, an upright axis, a lifting rotor including a plurality of blades pivotally mounted on said axis and a releasable connection between said engine and said upright axis, the pivotal connection of said blades to said axis comprising pivot axes arranged at oblique angles such as to provide an automatic range of pitch adjustment of said blades into and out of the range of self-rotation, and means for differentially varying the thrust of said two propellers.

16. In an aircraft two propelling means, an element in connection with each such means for varying the propelling force exerted by it, a differential assembly in connection with each element connecting the element to a common member, and a member adapted to oppositely displace corresponding members in the two differential assemblies.

17. In an aircraft two propellers, an element in connection with each propeller for varying the pitch of the propeller blades, a differential assembly in connection with each element, a member for simultaneously displacing similar elements of the two assemblies in the same direction, and a member for simultaneously displacing similar elements of the two assemblies in opposite directions.

18. In an aircraft a plurality of means for longitudinally propelling the craft, an element in connection with each such means for varying the propelling force exerted by it, a differential assembly in connection with each element, and a member for simultaneously displacing corresponding members in the respective differential assemblies in the directions producing like effects on the respective propelling means.

19. In an aircraft two means for longitudinally propelling the craft, an element in connection with each such means for varying the propelling force exerted by it, a differential assembly in connection with each element, a member for displacing corresponding parts of the two differential assemblies in the directions producing like effects on the two propelling means, and a member for displacing said parts in the directions producing opposite effects.

20. In aircraft a plurality of propellers rotatable on longitudinal axes, an element in connection with each propeller for varying the pitch thereof, a differential assembly in connection with each such element, and a member for simultaneously displacing corresponding members in the respective differential assemblies in the directions producing like changes of pitch in each propeller.

21. In aircraft a plurality of propellers rotatable on longitudinal axes, an element in connection with each propeller for varying the pitch thereof, a differential assembly in connection with each such element, and a member for simultaneously displacing corresponding members in the respective differential assemblies in directions such that the change of pitch for propellers on one side of the center line of the craft will be opposite from that for propellers on the opposite side thereof.

22. In an aircraft two propellers, an element in connection with each propeller for varying the pitch of the propeller blades, a differential assembly in connection with each element, a member for simultaneously displacing similar elements of the two assemblies in the same direction, a member for simultaneously displacing similar elements of the two assemblies in opposite directions, and means selectively displaced by changes in the heading of the craft for controlling said last mentioned member.

23. In an aircraft two means for longitudinally propelling the craft, an element in connection with each such means for varying the propelling force exerted by it, a differential assembly in connection with each element, a member for displacing corresponding parts of the two differential assemblies in the directions producing like effects on the two propelling means, a member for displacing said parts in the directions producing opposite effects, and means selectively displaced by changes in the heading of the craft for controlling said last mentioned member.

24. In aircraft a plurality of propellers rotatable on longitudinal axes, an element in connection with each propeller for varying the pitch thereof, a differential assembly in connection with each such element, a member for simultaneously displacing corresponding members in the respective differential assemblies in directions such that the change of pitch for propellers on one side of the center line of the craft will be opposite from that for propellers on the opposite side thereof, and means selectively displaced by changes in the heading of the craft for controlling said member.

25. In an aircraft two propelling means, an element in connection with each such means for varying the propelling force exerted by it, a differential assembly in connection with each element connecting the element to a common member, a member adapted to oppositely displace corresponding members in the two differential assemblies, and means selectively displaced by changes in the heading of the craft for controlling said last mentioned member.

26. In an aircraft two means for longitudinally propelling the craft, a member in connection with each such means for varying the propelling force exerted by it, a control unit in connection with each such member, each of said units comprising three elements so interconnected that the movement of each element is proportional to the sum or difference of movements proportional to those of the other two elements of the unit, one element in each unit being connected to one of said members for varying propelling force, a member for displacing in the same direction a second element in each unit, and a member for displacing in opposite directions the third element in each unit.

27. In an aircraft two propelling means, an element in connection with each such means for varying the propelling force exerted by it, an epicyclic gear unit in connection with each element, one member of each such unit being connected to operate one of said elements, a control member for displacing a second member of each of said units in the same direction, and a control member for oppositely displacing the third member of each of said units.

28. In an aircraft, a frame, a plurality of propelling means, differential mechanism associated therewith for varying forces exerted by them, a control member displaceable with respect to the frame for adjusting said mechanism for effecting similar variation of the several propelling forces, and another control member displaceable with respect to the frame for adjusting said mechanism for effecting dissimilar variation of the several propelling forces, each of said control members being capable of effecting its adjustment independently of the movement of the other control member with respect to the frame.

29. In aircraft, a rotor system comprising a plurality of airfoils each so shaped in cross-section that the resultant aerodynamic force thereon may act in a direction making an acute angle with the forward direction of the airfoil chord, a prime mover capable of furnishing power to rotate said system, and automatic means including pivot mechanism for the airfoils responsive to decrease in said power for decreasing the incidence angles of the airfoils into the range within which the resultant aerodynamic forces lie forward of the parallel to the axis of rotation of said system, said pivot mechanism for each airfoil comprising a pivot with its axis inclined, viewed in plan, to the longitudinal axis of the airfoil, and inclined at an acute angle with respect to the said axis of rotation.

30. In aircraft, a rotor system comprising a plurality of airfoils each so shaped in cross-section that the resultant aerodynamic force thereon may act in a direction making an acute angle with the forward direction of the airfoil chord, a prime mover capable of furnishing power to rotate said system, and means responsive to decrease in said power for decreasing the incidence angles of the airfoils into the range within which the resultant aerodynamic forces lie forward of the parallel to the axis of rotation of said system, said means including a hinge connection with its axis inclined with respect to a plane perpendicular to the said axis of rotation and at an acute angle with the longitudinal axis of each airfoil connecting the airfoil to a common supporting center.

31. In aircraft, a rotor comprising a plurality of blades each having an airfoil shape capable, when presented to the air within a certain range of angle of attack, of becoming self-advancing and at the same time developing substantial aerodynamic lift, a prime mover capable of transmitting power to the rotor, an automatic means, including pivot mechanism for the blades obliquely angled with respect thereto and to a plane perpendicular to the rotor axis, responsive to variations in the power transmitted to the rotor by the prime mover for altering the angles of attack of the blades into and out of the range within which the blades are self-advancing, said automatic means providing an adjustment range such that, under power, the system is capable of lifting the craft substantially vertically.

32. In aircraft, a rotor system comprising a rotatable blade support, a plurality of blades each tapered in cross-section toward its trailing edge, a hinge in conjunction with each blade making an acute angle with the major axis of the blade and with a plane perpendicular to the axis of the rotor system, and attaching the blade to the blade support, a prime mover, and a releasable connection between said prime mover and said support, the inclination of the hinge axis being such as to provide an automatic range of adjustment of blade pitch, in flight, which is greater than the range of self-rotation.

33. In an aircraft, a sustaining rotor including a rotatably-mounted common axis and wing means pivotally mounted thereon in position to be autorotationally actuated by relative air-flow, a pair of propulsive airscrews, one at each side of the craft, engine means for actuating said airscrews, connections to said rotor from the engine means including driving mechanism automatically operative, at a given speed of the engine means, to maintain the rotational speed of the rotor above a proportional predetermined minimum and constructed to provide for over-running of the rotor under the influence of airflow, and automatic means for varying the relative propulsive effect of the two airscrews to counteract the torque of the rotor drive.

34. In an aircraft, a sustaining rotor including a rotatably-mounted common axis and wing means pivotally mounted thereon in position to be autorotationally actuated by relative air-flow, a pair of propulsive airscrews, one at each side of the craft, engine means for actuating said airscrews, connections to said rotor from the engine means including driving mechanism automatically operative, at a given speed of the engine means, to maintain the rotational speed of the rotor above a proportional predetermined minimum and constructed to provide for over-running of the rotor under the influence of air-flow, automatic means for varying the relative propulsive effect of the two airscrews to counteract the torque of the rotor drive, and mechanism for varying the incidence of the wing means.

35. In an aircraft, a sustaining rotor including a rotatably-mounted common axis and wing means pivotally mounted thereon in position to be autorotationally actuated by relative air-flow, a pair of propulsive airscrews, one at each side of the craft, engine means for actuating said airscrews, connections to said rotor from the engine means including driving mechanism automatically operative, at a given speed of the engine means, to maintain the rotational speed of the rotor above a proportional predetermined minimum and constructed to provide for over-running of the rotor under the influence of airflow, automatic means for varying the relative propulsive effect of the two airscrews to counteract the torque of the rotor drive, and mechanism automatically responsive to rotor driving torque conditions to change the incidence of the wing means.

HAROLD T. AVERY.

Certificate of Correction

Patent No. 1,993,701.　　　　　　　　　　　　　　　　　　　　March 5, 1935.

HAROLD T. AVERY

It is hereby certified that errors appear in the printed specification of the above numbered patent requiring correction as follows: Page 3, first column, line 2, after "craft" insert the word *that*; page 5, first column, line 74, for "downwash-incidence" read *downwash=incidence*; page 7, first column, strike out the heading in lines 25 and 26, "NOVEL TYPE OF ROTOR" *"Hinge arrangement"* and insert the same after line 18, same page and column; page 7, second column, line 65, for "about" read *above;* page 10, second column, line 68, strike out the formula and insert instead $V_R - V_F = 2.5 V_F.$; and line 70, strike out the formula and insert instead $V_R - V_F = 0.5 V_F.$; and that the said Letters Patent should be read with these corrections therein that the same may conform to the record of the case in the Patent Office.

Signed and sealed this 30th day of April, A. D. 1935.

[SEAL]　　　　　　　　　　　　　　　　　　　　　　　　LESLIE FRAZER,
*Acting Commissioner of Patents.*